US012605293B2

(12) United States Patent
Marzoratti et al.

(10) Patent No.: US 12,605,293 B2
(45) Date of Patent: Apr. 21, 2026

(54) ELECTRIC POWER-ASSISTING WHEELCHAIR CONTROL DEVICE

(71) Applicant: Technotonin Industries LLC, Franklin, MA (US)

(72) Inventors: Antonio Marzoratti, Franklin, MA (US); Arav Tyagi, Franklin, MA (US)

(73) Assignee: Technotonin Industries LLC, Franklin, MA (US)

( * ) Notice: Subject to any disclaimer, the term of this patent is extended or adjusted under 35 U.S.C. 154(b) by 534 days.

(21) Appl. No.: 18/172,588

(22) Filed: Feb. 22, 2023

(65) Prior Publication Data

US 2024/0277539 A1     Aug. 22, 2024

(51) Int. Cl.
*A61G 5/04*          (2013.01)
*H02K 5/00*          (2006.01)
(Continued)

(52) U.S. Cl.
CPC .............. *A61G 5/047* (2013.01); *H02K 5/00* (2013.01); *H02K 11/0094* (2013.01); *H02K 11/33* (2016.01)

(58) Field of Classification Search
CPC .......... A61G 4/04; A61G 5/047; A61G 5/048; H02K 5/00; H02K 11/0094; H02K 11/33
(Continued)

(56) References Cited

U.S. PATENT DOCUMENTS 4,422,515 A * 12/1983 Loveless .............. A61G 5/1054
                                                    280/250.1
5,125,468 A *  6/1992 Coker .................. A61G 5/1051
                                                    180/907
(Continued)

FOREIGN PATENT DOCUMENTS

WO      WO 1992010157          6/1992

OTHER PUBLICATIONS aliexpress.us, [online], "3-Axis Joystick Potentiometer R300B-M2 5K 3D Security Yuntai Control Ball Machine Keyboard Monitor Joystick," upon information and belief, available no later than Feb. 22, 2023, retrieved on Feb. 6, 2024, <https://www.aliexpress.us/item/2255800800902180.html?gatewayAdapt=glo2usa>, 5 pages.
(Continued)

*Primary Examiner* — Valentin Neacsu
*Assistant Examiner* — Felicia L. Brittman-Alabi
(74) *Attorney, Agent, or Firm* — Fish & Richardson P.C.

(57)          ABSTRACT
Disclosed herein is a portable and attachable power-assisting wheelchair device for non-electrically powered wheelchairs. The power assisting device includes a first motor mechanically coupled to a first rotatable end via a first shaft. A first driver is electrically coupled to the first motor and is configured to control a velocity of the first motor. A second motor is mechanically coupled to a second rotatable end via a second shaft. A second driver is electrically coupled to the second motor, and is configured to control a velocity of the second motor. Fillers are disposed between the rotatable ends and the flexible rings. A controller sends control signals to the first driver and the second driver. The control signals include information representing a first torque, a second torque, and rotational velocities for the first rotatable end and the second rotatable end.

19 Claims, 5 Drawing Sheets

(51) Int. Cl.
    *H02K 11/00*        (2016.01)
    *H02K 11/33*        (2016.01)
(58) Field of Classification Search
    USPC ......................................................... 180/11
    See application file for complete search history.

(56) References Cited

U.S. PATENT DOCUMENTS

| | | | |
|---|---|---|---|
| 11,154,443 B2 | 10/2021 | Peskin et al. | |
| 2015/0033895 A1* | 2/2015 | Olson | G05G 9/047 |
| | | | 74/471 XY |

OTHER PUBLICATIONS buildmywheelchair.com, [online], "T-Bar Joystick Knob," upon information and belief, available no later than Feb. 22, 2023, retrieved on Feb. 6, 2024, <https://buildmywheelchair.com/t-bar-joystick-knob/?gclid=CjwKCAjw1ICZBhAzEiwAFfvFhLzENFq3jO2VgXDii9-aPI3p8UJjdKmnEDDHk9dmicECI1HmWS-gQRoCzP0QAvD_BwE>, 5 pages.

etsy.com, [online], "Throttle-Joystick Handle for Electric Wheelchairs and Mobility Powerchair," upon information and belief, available no later than Feb. 22, 2023, retrieved on Feb. 6, 2024, <https://www.etsy.com/listing/1130882387/throttle-joystick-handle-for-electric?gpla=1&gao=1&&utm_source=google&utm_medium=cpc&utm_campaign=shopping_us_c-electronics and accessories-gadgets&utm_custom1=_k_CjwKCAjw1ICZBhAzEiwAFfvFhOq6_g9enZHILCCycg3J-TF1vPPG9O2jAwsTt6O7rxwSMdvvKSibVxoCoGIQAvD_BwE_k_&utm_content-go_1843970785_69216069505_346429262312_pla-353904501530_c__1130882387_12768591&utm_custom2=1843970785&gclid=CjwKCAjw1ICZBhAzEiwAFfvFhOq6_g9enZHILCCycg3J-TF1vPPG9O2jAwsTt6O7rxwSMdvvKSibVxoCoGIQAvD_BwE>, 16 pages.

news.gatech.edu, [online], "Tongue Drive Wheelchair," available on or before Sep. 17, 2021, Internet Archive: Wayback Machine URL <https://web.archive.org/web/20210917043614/https://news.gatech.edu/archive/features/tongue-drive-wheelchair.shtml>, retrieved on Mar. 8, 2024, <https://news.gatech.edu/archive/features/tongue-drive-wheelchair.shtml>, 6 pages.

numotion.com [online], "Ability Drive: Eye Tracking Control System for Power Wheelchairs," available on or before Aug. 10, 2020, Internet Archive: Wayback Machine URL <https://web.archive.org/web/20200810111021/https://www.numotion.com/products-services/innovative-lifestyle-products/ability-drive>, retrieved on Feb. 6, 2024, <https://www.numotion.com/products-services/innovative-lifestyle-products/ability-drive>, 6 pages.

permobil.com, [online], "SmartDrive MX2+," available on or before Mar. 14, 2022, Internet Archive: Wayback Machine URL <https://web.archive.org/web/20220314052719/https://www.permobil.com/en-us/products/power-assist/smartdrive-mx2>, retrieved on Feb. 6, 2024, <https://protect-us.mimecast.com/s/MASvCv2YRzcMvWDzSwSO3d?domain=permobil.com>, 12 pages.

rehabmart.com, [online], "SMOOV Electric Power Assist for Manual Wheelchairs by Alber USA," upon information and belief, available no later than Feb. 22, 2023, retrieved on Feb. 6, 2024, <https://www.rehabmart.com/product/smoov-wheelchair-power-assist-50181.html?gclid=CjwKCAjwpqCZBhAbEiwAa7pXebCSOcpK-2-LAKJhf5qct4FuTVhYHHn6Qcj4fYSvMEDfVmTz-CKNFxoCKk0QAvD BwE>, 21 pages.

sunrisemedical.com, [online], "Switched Head Arrays," available on or before Sep. 25, 2021, Internet Archive: Wayback Machine URL <https://web.archive.org/web/20210925094530/https://www.sunrisemedical.com/power-wheelchairs/switch-it-electronics/head-controls/switched-head-arrays>, retrieved on Feb. 6, 2024, <https://www.sunrisemedical.com/power-wheelchairs/switch-it-electronics/head-controls/switched-head-arrays>, 5 pages.

wikipedia.com, [online], "Switched Head Arrays," available on or before Oct. 17, 2012, Internet Archive: Wayback Machine URL <https://web.archive.org/web/20121017051853/https://en.wikipedia.org/wiki/Sip-and-puffs>, retrieved on Mar. 8, 2024, <https://en.wikipedia.org/wiki/Sip-and-puff>, 2 pages.

\* cited by examiner

ELECTRIC POWER-ASSISTING WHEELCHAIR CONTROL DEVICE

TECHNICAL FIELD

Disclosed herein is a portable power-assisting wheelchair device for non-electrically powered wheelchairs.

BACKGROUND

Wheelchairs provide a mechanical mechanism for enabling the physical mobility for users of limited mobility, often as a result of illness, injury, or disability. A wheelchair includes a set of wheels, a platform for accommodating the user, such as a chair, and a steering mechanism. The platform and steering mechanism of a given wheelchair varies depending on the dimensions of the user, or the nature of the injury or disability.

Mobility of the wheelchair depends on the set of wheels and a steering mechanism for selecting the direction in which the wheelchair moves. In some wheelchairs, the wheels are also part of the steering mechanism, and the wheels can be rotated manually by the user, or driven automatically by a power source.

SUMMARY

This specification describes a portable, attachable power-assisting wheelchair device for non-powered wheelchairs. In some aspects of the disclosure, an attachable power assisting device provides electrical power for moving a wheelchair. The attachable power assisting device has a first motor mechanically coupled to a first rotatable end via a first shaft. A first driver is electrically coupled to the first motor, the first driver configured to control a velocity of the first motor. A first flexible ring is disposed between the first rotatable end and the first shaft. A first filler is disposed between the first rotatable end and the first flexible ring. The first filler being is more rigid than the first flexible ring. A second motor is mechanically coupled to a second rotatable end via a second shaft. A second driver is electrically coupled to the second motor, the second driver configured to control a velocity of the second motor. A second flexible ring is disposed between the second rotatable end and the second shaft. A second filler is disposed between the second rotatable end and the second flexible ring. The second filler is more rigid than the second flexible ring. A controller sends control signals to the first driver and the second driver. The control signals includes information representing a first torque, a second torque, and rotational velocities for the first rotatable end and the second rotatable end.

In some implementations, the attachable power assisting device has a housing, at least, partially encloses the first motor, the first driver, the second motor, and the second driver.

In some implementations, the housing includes a first hole and a second hole, and the first shaft and second shaft are disposed, respectively, through the first and second hole. The first and second rotatable ends are disposed external to the housing.

In some implementations, the attachable power assisting device includes a microcontroller configured to process control signals from the controller. The microcontroller electrically is coupled to the first driver and the second driver.

In some implementations, the first and second flexible rings are made of a polymer, and the first and second fillers are made from a polylactic acid.

In some implementations, the first rotatable end has a first cylindrical body having a first radial center extending through the first cylindrical body. The first shaft extends through the first radial center of the first cylindrical body. The second rotatable end has a second cylindrical body and a second radial center extending through the second cylindrical body. The second shaft extends through the second radial center of the second cylindrical body.

In some implementations, the first and second rotatable ends are configured to rotate in opposite directions.

In some implementations, the first and second rotatable ends are configured to rotate in a same direction.

In some implementations, the controller is a joystick having a handle and a shaft, the shaft having up to 360 degree directionality.

In some implementations, the handle of the joystick is configured to rotate up to 360 degrees about a center of the shaft.

In some implementations, the controller is controller is configured to attach and detach to an interface that is electrically coupled to the processor.

Aspects of the disclosure are directed to a wheelchair power assisting system having a first motor mechanically coupled to a first rotatable end via a first shaft. A first driver electrically coupled to the first motor, configured to control a velocity of the first motor. A first flexible ring is disposed between the first rotatable end and the first shaft. A first filler is disposed between the first rotatable end and the first flexible ring. The first filler is more rigid than the first flexible ring. A second motor is mechanically coupled to a second rotatable end via a second shaft. A second driver is electrically coupled to the second motor, and is configured to control a velocity of the first motor. A second flexible ring is disposed between the second rotatable end and the second shaft. A second filler is disposed between the second rotatable end and the second flexible ring. The second filler is more rigid than the second flexible ring. A non-transitory computer readable medium stores instructions. The instructions when executed by a processor configured to cause the first driver and the second driver to transmit control signals to the first motor and second motor, respectively. In some implementations, each of the control signals being a pulse-modulating width signal.

In some implementations, the processor transmits control signals to the first driver and the second driver. The control signals includes a first torque, a second torque, and rotational velocities for the first rotatable end and the second rotatable end.

In some implementations, the wheelchair power assisting system includes a controller for transmitting control signals to the processor. The processor is mounted within a housing.

In some implementations, the housing, at least, partially encloses the first motor, the first driver, the second motor, and the second driver.

In some implementations, the first motor and the second motor are configured to apply a torque to the first shaft and second shaft, respectively. The torque is between about 1 Newton meter (NM) and about 50 NM.

In some implementations, the processor is configured to send control signals to the first and second motors enabling the first rotatable end and the second rotatable end to rotate at a velocity between about 1 rotation per minute (RPM) and about 2000 RPM.

Aspects of the disclosure are directed to an attachable torque-supplying device. The torque-supplying device includes a first motor mechanically coupled to a first rotatable end via a first shaft. A first driver is electrically coupled to the first motor and is configured to control a velocity of the first motor. A first flexible ring is disposed between the first rotatable end and the first shaft. A first filler is disposed between the first rotatable end and the first flexible ring. The first filler is more rigid than the first flexible ring. A second motor is mechanically coupled to a second rotatable end via a second shaft. A second driver is electrically coupled to the second motor, configured to control a velocity of the first motor. A second flexible ring is disposed between the second rotatable end and the second shaft. A second filler is disposed between the second rotatable end and the second flexible ring. The second filler is more rigid than the second flexible ring. A non-transitory computer readable medium stores instructions that when executed by a processor is configured to cause the first driver and the second driver to transmit control signals to the first motor and second motor, respectively. A controller transmits control signals to the processor. The control signals includes signals for a first torque, a second torque, and rotational velocities for the first rotatable end and the second rotatable end. A housing, at least, partially encloses the first motor, the first driver, the second motor, and the second driver.

In some implementations, the attachable torque-supplying device includes at least one first opening disposed in the first rotatable end, and at least one second opening disposed in the second rotatable end. In some implementations, the first filler is disposed in the first opening and second filler is disposed in the second opening. The first and second filler have a different density than a material of the first and second flexible rings.

In some implementations, the attachable torque-supplying device includes a microcontroller that is configured to process control signals from the controller. The microcontroller is electrically coupled to the first driver and the second driver.

The details of one or more implementations are set forth in the accompanying drawings and the description below. Other features, objects, and advantages will be apparent from the description and drawings, and from the claims. For example, a user of the power-assisting wheelchair device need no longer rely on physical or manual power to move the wheelchair and can therefore increase range of mobility over a given time. The wheelchair device decouples velocity, power, and steerability of the wheelchair from the physical strength and endurance of the user. The control system, housing, and materials used to rotate the wheelchair are designed to accommodate a range of users and wheelchair nees, giving the user of manual wheelchairs many of the advantages of electric-power wheelchairs.

DESCRIPTION OF DRAWINGS

Like reference symbols in the various drawings indicate like elements.

DETAILED DESCRIPTION

Described herein an attachable power-assisting wheelchair device for wheelchairs that are not electrically powered. The power-assisting wheelchair device is configured to create an electrical power source for non-powered wheelchairs. Non-powered wheelchairs are predominately manually powered and/or steered. The power-assisting wheelchair device is adaptable to these manual wheelchairs and has a distributed control system that enables the power-assisting wheelchair device to be adapted to different types of joysticks and controllers. Advantageously, the power-assisting wheelchair device can accommodate users of varying disabilities, injuries, or mobility needs.

Figure 1:
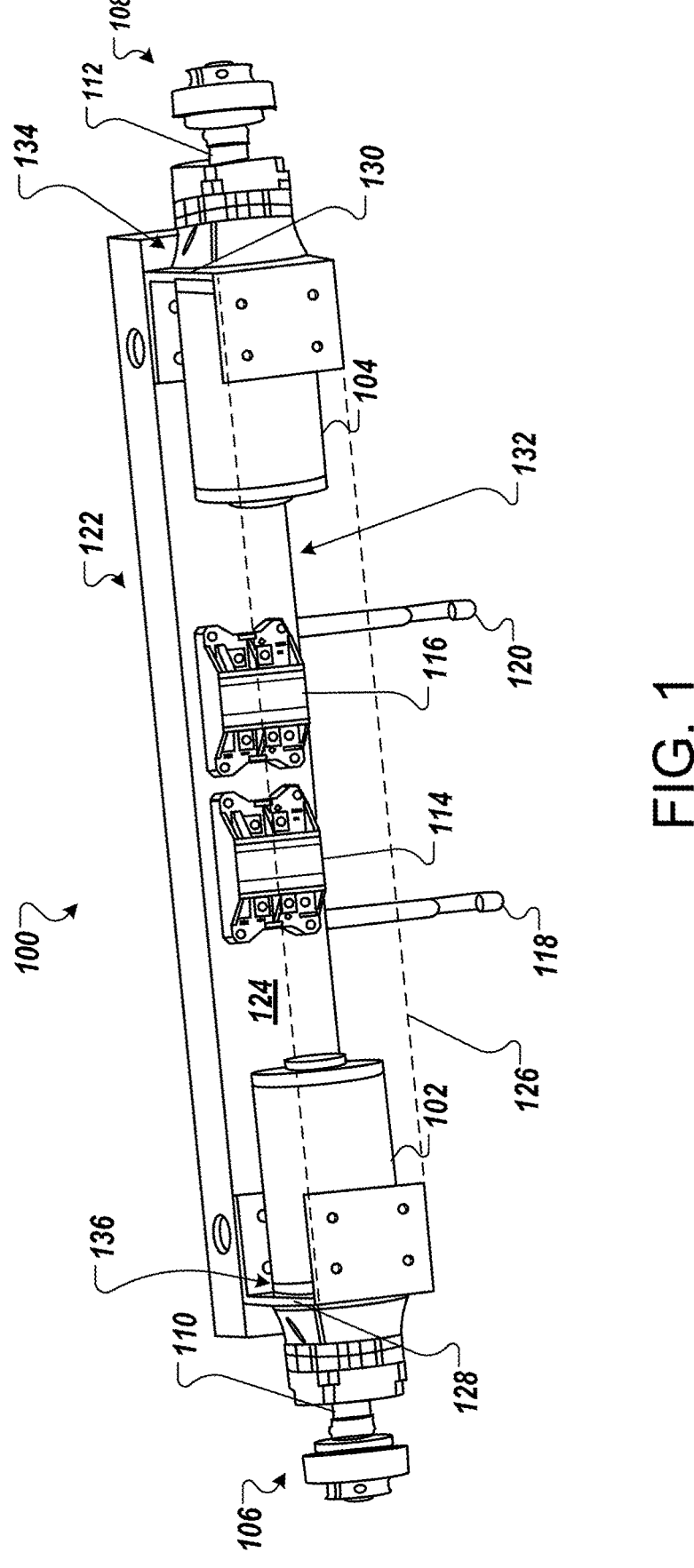
FIG. 1 is a front perspective view of an attachable power assisting device for a wheelchair.

FIG. 1 is a front perspective view of an attachable power assisting device 100 for a wheelchair. The attachable power assisting device 100 has a first motor 102 that is disposed opposite a second motor 104. A first shaft 110 mechanically couples a first rotatable end 106 to the first motor 102. A second shaft 112 mechanically couples a second rotatable end 108 to the second motor 104.

A first driver 114 and a second driver 116 are attached to a housing 122 of the attachable power assisting device 100. The housing 122 includes a first wall 124, a second wall 126 (shown in phantom) opposite the first wall 124, a third wall 128, and a fourth wall 130 opposite the third wall 128. The third wall 128 and fourth wall 130 are each substantially orthogonal to the first wall 124 and the second wall 126. Accordingly, the first wall 124 is substantially parallel to the second wall 126. The third wall 128 is substantially parallel to the third wall 128. The first wall 124, second wall 126, third wall 128, and fourth wall 130 surround an internal space 132.

A first through-hole 134 extends through the third wall 128, and a second through-hole 136 extends through the fourth wall 130. Accordingly, the first shaft 110 extends through the third wall 128 of the housing 122 via the first through-hole 134. Similarly, the second through-hole 136 disposed in the fourth wall 130 enables the second shaft 112 to extend through the second through-hole 136.

A first attaching member 118 and a second attaching member 120 are attached to the housing 122. Each one of the first attaching member 118 and the second attaching member 120 is configured to detachably mount a power source 312 (shown in FIG. 3). However, utilizing the first and second attaching members 118, 120 together reduces any rotational velocity of the power source 312 when the attachable power assisting device 100 is attached to a wheelchair (shown in FIGS. 5A-5B). In this manner utilizing first and second attaching members 118, 120 together reduces the influence of a momentum of the power source 312 on the wheelchair 500, and thereby enables greater stability in maneuvering the wheelchair 500. The housing 122 facilitates ease of attachment, detachment, and storage of attachable power assisting device 100. Moreover, the symmetry of the housing 122 enables the attachable power assisting device 100 to apply a uniform pressure to wheels of a wheelchair 500, shown in FIG. 5. In some implementations, a locking mechanism (not shown) is attachable to the housing 122 that when engaged increases normal force applied from the 106 to the wheelchair 500 wheel creating greater wheel-to-wheel friction.

Figure 2:
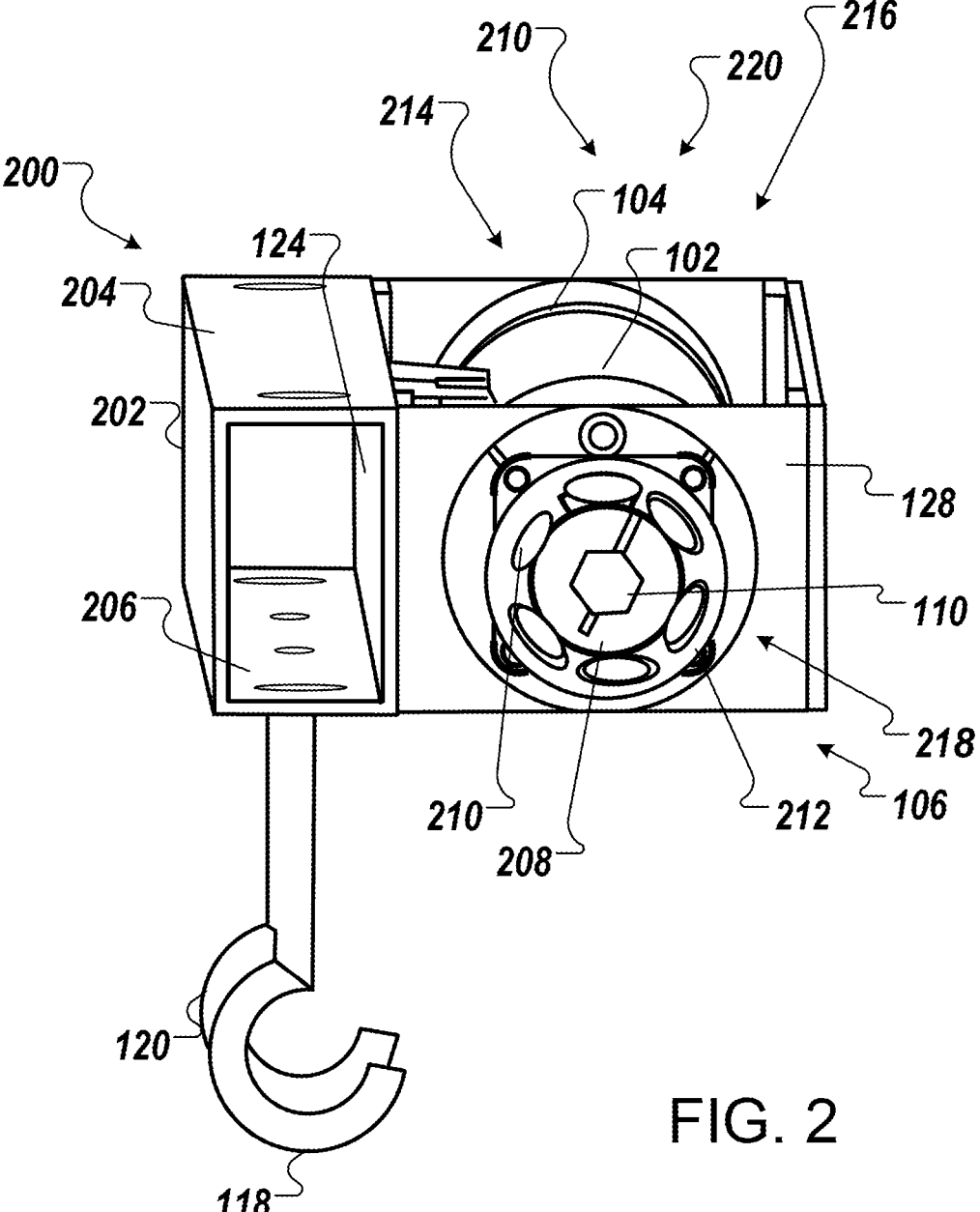
FIG. 2 is a side perspective view of the attachable power assisting device shown in FIG. 1.

FIG. 2 is a side perspective view of the attachable power assisting device 100 shown in FIG. 1. The housing 122 includes a support structure 200. The support structure includes the first wall 124. The support structure has a fifth wall 202 opposite the first wall 124, and a seventh wall 206 opposite a sixth wall 204. The sixth and seventh walls 204, 206 are substantially parallel to one another. Furthermore, the first and fifth walls 124, 202 are substantially orthogonal to the sixth and seventh walls 204, 206. Naturally, the first wall 124 is substantially parallel to the fifth wall 202.

The first rotatable end 106 has a first cylindrical body 218 having a first radial center extending through the first cylindrical body 218. The first shaft 110 extends through the first radial center of the first cylindrical body. The second rotatable end 108 has a second cylindrical body 220 and a second radial center extending through the second cylindrical body 220. The second shaft 112 extends through the second radial center of the second cylindrical body. The first and second cylindrical bodies 218, 220 include one or more non-compliant members disposed within a compliant member, where the compliant member has a modulus of elasticity that is greater than the non-compliant members. In some implementations, the compliant member has a modulus of rigidity that is less than a modulus of rigidity of the non-compliant member. For example, in some implementations, first and second flexible rings 212, 216 are compliant members, and one or more fillers are non-compliant members.

A first disk 208 is attached to and radially disposed at an end of the first shaft 110. A first flexible ring 212 is radially disposed over and in contact with the first disk 208. The first flexible ring 212 is made from a polymer. Although some details of the features are obscured, it is understood that a second disk 214 is attached to and radially disposed at an end of the second shaft 112. A second flexible ring 216 is radially disposed over and in contact with the second disk 214. And, the second flexible ring 216 is made from the polymer. Accordingly, the second disk 214 and the second flexible ring 216 are arranged on the second shaft 112 in substantially the same manner as the first disk 208 and first flexible ring 212 are disposed on the first shaft 110.

The first disk 208 and the second disk 214 each have fillers 210 disposed between openings in the first and second disks 208, 214. In some implementations, the filler 210 is a second polymer or plastic. The second polymer has a density that is greater than a density of the polymer. Advantageously, the second polymer provides rigidity to the first and second disks 208, 214 enabling the first and second flexible rings 212, 216 to contact a wheel (FIG. 5A-5B) of the wheelchair 500 with a greater force without deforming the first and second disks 208, 214. As such, the attachable power assisting device 100 remains in contact with the wheel when rough terrain is encountered and during turns of the wheelchair when the weight of the wheelchair 500 may shift.

The first and second flexible rings 212, 216 are made from a compliant material that enables superior traction with wheelchair wheels in comparison to rigid or metallic wheels. When first and second flexible rings 212, 216 flexible rings contact the wheelchair wheels the compliant material deforms under applied pressure, thus increasing surface area between the first and second flexible rings 212, 216 and the wheelchair wheels. Accordingly, slippage between the first and second flexible rings 212, 216 and the wheelchair wheels (e.g., rear wheel 508 shown in FIGS. 5A-5B) is reduced in comparison to metallic or rigid wheels.

As illustrated in FIG. 2, each filler 210 is disposed in between and in contact with the first and second flexible rings 212, 216 and the first and second shafts 110, 112, respectively. The fillers 210 are more rigid than the first and second flexible rings 212, 216 and thus reduces slippage between rotating first and second shafts 110, 112 and the compliant material of the first and second flexible rings 212, 216.

The first and second flexible rings 212, 216 are made of rubber, in some implementations. Accordingly, in some implementations, the first and second flexible rings 212, 216 are rubber wheels. In some implementations, the fillers 210 are made of a polylactic acid (PLA). In some implementations, the filler 210 may be formed by injection molding, 3-D printing, dicing, or similar cutting techniques. By utilizing a filler 210 between the first and second shafts 110, 112 and the first and second flexible rings 212, 216, enables the first and second motors 102, 104 to apply a higher torque to the first and second rotatable ends 106, 108. The torque applied by the motor dissipates in the first and second flexible rings 212, 216 as a radial position of the first and second flexible rings 212, 216 increases from the center of the first or second shafts 110, 112. The fillers 210 (e.g., at least a first and second filler) have a different density than a material of the first and second flexible rings 212, 216.

The filler 210 enables the first and second shafts 110, 112 to apply more torque directly to the filler 210, which reduces the amount of torque that would be lost without using the filler 210. While a larger diameter rigid wheel may apply a similar torque without use of the filler 210, utilizing the filler 201 enables the overall radius of the first and second rotatable ends 106, 108 to be smaller than the larger diameter rigid wheel while maintaining the same torque and requiring less power to rotate. In at least one implementation, the torque is between about 1 Newton meter (NM) and about 50 NM. In at least one implementation, the first rotatable end and the second rotatable end to rotate at a velocity between about 1 rotation per minute (RPM) and about 200 RPM. However, it understood that the torque and rotational velocity are examples and that components of the attachable power assisting device 100 can be adapted to accommodate other torques and rotational velocities.

Figure 3:
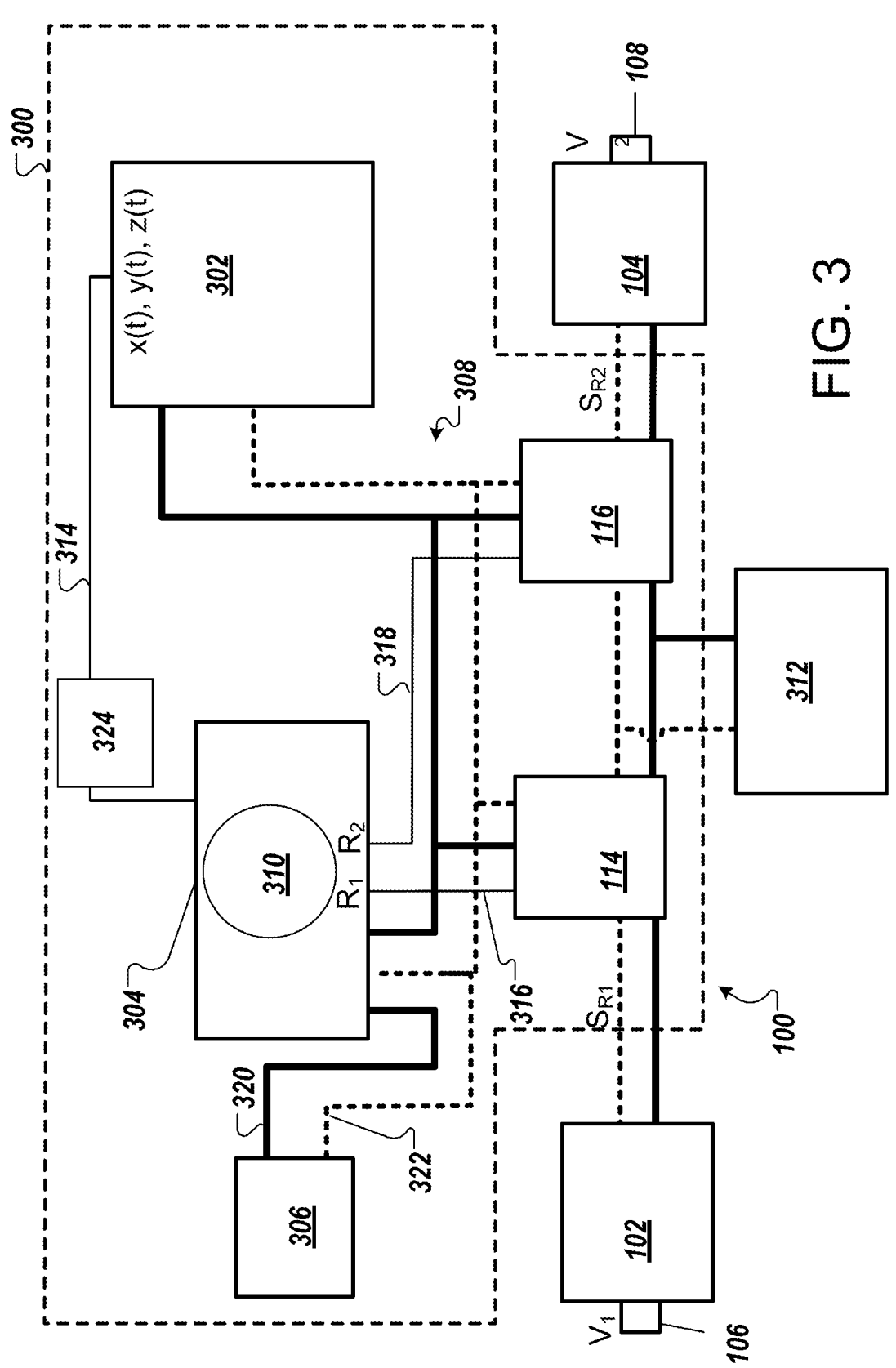
FIG. 3 is a plan view of the attachable power assisting device electrically coupled to a control system and a power source.

FIG. 3 is a plan view of the attachable power assisting device 100 electrically coupled to a control system 300 and a power source 312. The control system 300 includes a controller 302, a processor 304, a power supply 306, and circuitry 308, and interface 324, and the first and second drivers 114, 116. The circuitry 308 that electrically couples each of the controller 302, processor 304, and the power supply 306 to one another. In this manner, the control system 300 can transmit and receive signals from the first and second drivers 114, 116. In some implementations, a battery level detector (not shown) is electrically coupled to the power source 312 to indicate lower power, and separately, to prevent a "brown out" of the processor 304.

The control system 300 is a distributed system thus facilitating component selectivity, which enables exchange, replacement, or upgrading of each of the components in the control system 300. For example, each of the controller 302, processor 304, the power supply 306, first and second drivers 114, 116, and the interface 324 can be exchanged, replaced, or upgraded. Exchanging the processor 304 allows replacement with faster state-of-the art processors, which allow the control system 300 to adapt to state-of-the-art controllers and joysticks. In some implementations, the processor 304 contains one or more programs that enable auto-correcting steering. For example, the processor 304 can includes programs that accommodate for hand tremors (e.g., from Parkinson's), or impulsive hand movements that would cause abrupt, or undesirable wheelchair movements without utilizing the processor 304. In some implementations the processor 304 is programmed so that a gyro joystick can be utilizes as the controller 302, which prevents tipping, or can determine whether the wheelchair is slipping, e.g., sliding on an icy surface. In this manner, the attachable power assisting device 100 is adaptable for users having a wider range of disabilities that may require different wheelchairs and different control types.

The controller system 300 is electrically coupled to the first and second motors, 104 and the first and second drivers 114, 116. The controller system 300 provides signals to the first and second drivers 114, 116. The controller system 300 includes a processor 304, a memory 310, and circuitry 308 that are coupled to one another. The processor 304 may be one of any form of general purpose microprocessor, or a general purpose central processing unit (CPU), each of which can be used in an industrial setting, such as a programmable logic controller (PLC), supervisory control and data acquisition (SCADA) systems, or other suitable industrial controller. The memory 310 is non-transitory computer readable medium and may be one or more of readily available memory such as random access memory (RAM), read only memory (ROM), or any other form of digital storage, local or remote. The memory 310 contains instructions, that when executed by the processor 304, facilitates execution of the instructions received from the controller 302.

The instructions in the memory 310 are in the form of a program product such as a program that implements the method of the present disclosure. The program code of the program product may conform to any one of a number of different programming languages. Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., or hard-disk drive or any type of solid-state random-access semiconductor memory) on which alterable information is stored. Such computer-readable storage media, when carrying computer-readable instructions that direct the functions of the methods described herein, are examples of the present disclosure.

In some implementations, power supply 306 supplies power to the processor 304 and the controller 302. In at least one implementation, the processor 304 is an Arduino microcontroller and the memory 310 is memory housed in the Arduino microcontroller. The processor 304, in at least one example, has a power supply 306. The power supply 306 can have a voltage of between about 4V and about 10V, such as about 5V or about 9V.

A first signal line 314 is directly coupled between the controller 302 and the processor 304. A second signal line 316 directly couples the processor 304 to the first driver 114. A third signal line 318 directly couples the second driver 116 to the processor 304. A positive power line 320 and a negative power line 322 is coupled to each component of the controller system 300, the first and second drivers 114, 116 and the first and second motors 102, 104. The circuitry 308 includes first, second, and third signal lines 314, 316, 318 and positive, negative power lines 320, 322.

The first signal line 314 transmits three signals, including two directional signals, i.e., an axis directional signal, x(t), and an ordinate directional signal, y(t) from the controller 302 to the processor 304. In some implementations, the controller 302 transmits a supplemental signal, z(t) to the processor 304. Collectively, the directional signals, x(t), y(t), and supplemental signal z(t) are referred to as positional signals, x(t), y(t), z(t). In one example, each of the positional signals, x(t), y(t), z(t) is an analog signal received from a potentiometer within the controller 302. In another implementation, the positional signals, x(t), y(t), z(t) are digital signals received from a digital processor (not shown) in the controller 302. In other implementations, the positional signals, x(t), y(t), z(t) can be a combination of analog and digital signals. The controller 302 may output additional signals depending upon the type of controller used, but the positional signals, x(t), y(t), z(t) will be among the additional signals.

The directional signals x(t), y(t) output by the controller 302 are received at the processor 304 containing data indicating how the wheelchair should move on an x-y plane. In some implementations, the supplemental signal z(t) indicates a rotational direction and velocity in correspondence to a rotational input of the controller 302. For example, if the controller 302 has is a joystick with three-degrees of freedom (x, y, and z), a rotation of the joystick's head about an axis extending through the center of the joystick's head directly corresponds to the rotation of the wheelchair.

The directional signals, x(t), y(t), and supplemental signal, z(t) contain data that, when processed at the processor 304 and first and second first and second drivers 114, 116, control the velocity, rotation, and torque of the first and second shafts 110, 112 applied by the first and second motors 102, 104, respectively. More specifically, the directional signals, x(t), y(t), control the rotational velocity and torque of the first and second shafts 110, 112 in a same rotational direction, e.g., forwards and backwards at a certain velocity. In some implementations, the supplemental signal z(t) determines the velocity of rotation and torque at which the first shaft 110 and second shaft 112 rotate in opposite directions. For example, upon processing of the positional signals, x(t), y(t), z(t) signals at the processor 304, the velocities and torque of the first and second motors 102, 104 are known.

The processor 304 outputs a first vector signal $R_1$ to the first driver 114 and a second vector signal $R_2$ to the second driver 116. The first driver 114 converts the first vector signal $R_1$ into a first driving signal $S_{R1}$ that causes the first motor 102 to rotate at a first rotational vector $V_1$ $(\omega_1, \tau_1)$ that includes angular velocity $\omega_1$ and torque $\tau_1$. Additionally, the second driver 116 converts the second vector signal $R_2$ into a second driving signal $S_{R2}$ that causes the second motors 102 to rotate at a second rotational vector $V_2$ $(\omega_2, \tau_2)$ that includes angular velocity $\omega_2$ and torque $\tau_2$.

The controller 302 transmits signals to the processor 304 via the first signal line 314. The processor 304 transmits signals from the controller 302 to the first and second first and second drivers 114, 116, respectively. Specifically, the second signal line 316 transmits signals from the processor 304 to the first driver 114, and the third signal line 318 transmits signals from the processor 304 to the second driver 116. Accordingly, the first and second first and second drivers 114, 116 provide a current to the first and second first and second motors 102, 104. The power source 312 provides power to the first and second motors 102, 104. A rotational velocity of the first and second motors 102, 104 is determined by the current supplied by the first and second first and second drivers 114, 116.

The processor 304 processes signals originating from the controller 302 that provide instructions on how the first and second motors 102, 104 should rotate. As noted, the current received by the first and second drivers 114, 116 is set by the processor 304, in response to signals received by the controller 302. The first and second drivers 114, 116 regulate the current that propagates to the first and second motors, 102, 104. Accordingly, the current generated by the first and second drivers 114, 116 control the velocity, torque, and a rotational direction at which the first and second motors, 102, 104 rotate. More specifically, the first and second drivers 114, 116 regulate the amount of current provided by the power source 312 to first and second motors, 102, 104, the current controlling the velocity, torque, and a rotational direction of the first and second drivers 114, 116.

The interface 324 is disposed between the controller 302 and the processor 304 and enables attachment of different types of controllers without changing hardware or software of the controller 302. Accordingly, controller 302 is configured to attach and detach to the interface 324, which is electrically coupled to the processor 304. In one example, the controller 302 is a joystick (e.g., a 3-axis joystick) that has a base, a stick attached to the base, and a ball attached to the stick. Alternatively, the controller 302 can be a t-bar joystick, an eye tracking control system, a throttle joystick, a tongue drive controller, a Sip-and-puff controller, or a switched head arrays controller. However, alternate examples of the controller 302 are contemplated without departing from the scope of the disclosure. Although not shown, the control system 300 can include a switch, such as a button, to open and close the circuitry 308 to the power source 312. Accordingly, the software and/or hardware described herein can be adapted to accommodate more advanced personalized controllers.

Figure 4:
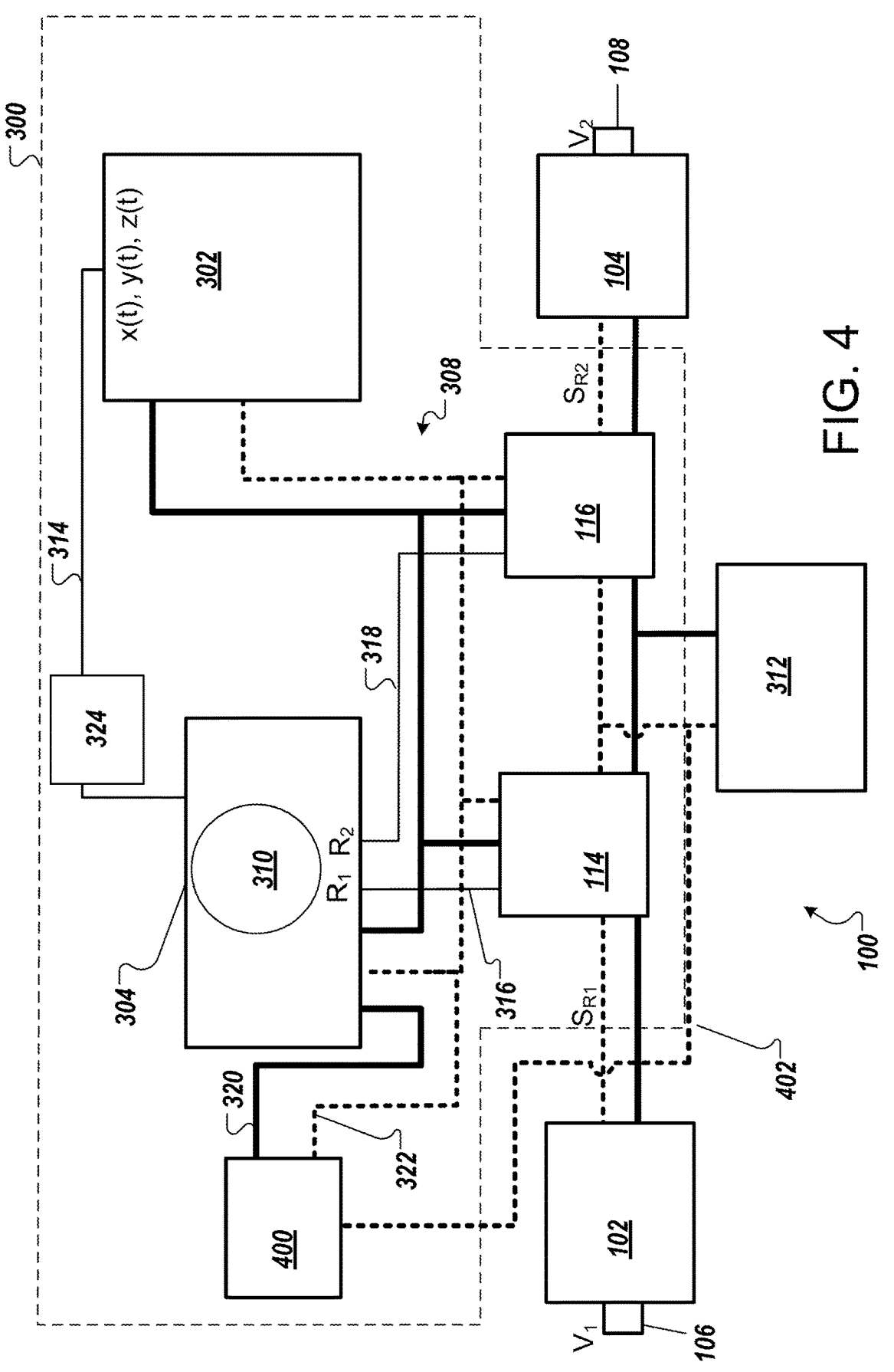
FIG. 4 is an alternative plan view of the attachable power assisting device having a power regulator coupled to the power source.

FIG. 4 is an alternate plan view of the attachable power assisting device 100 electrically. The control system 300 has a power regulator 400 that replaces the power supply 306, shown in FIG. 3. The power regulator 400 is directly coupled to the power source 312 and the processor 304. More specifically, the positive power line 320 is coupled to the Vin port on the processor 304 and the negative power line 322 is coupled to the ground port on the processor 304. Additionally, the negative power line 322 directly couples the power regulator 400 to the first shaft 110. A power line 402 directly couples the power source 312 and the power regulator 400. The power line 402 provides DC power to the power regulator 400. The power regulator 400 can be a voltage regulator or, in some implementations, the power regulator 400 is a current regulator that ensures a sufficient amount of power is supplied to the processor 304 without damaging the processor 304 or the power source 312.

Figures 5A, 5B:
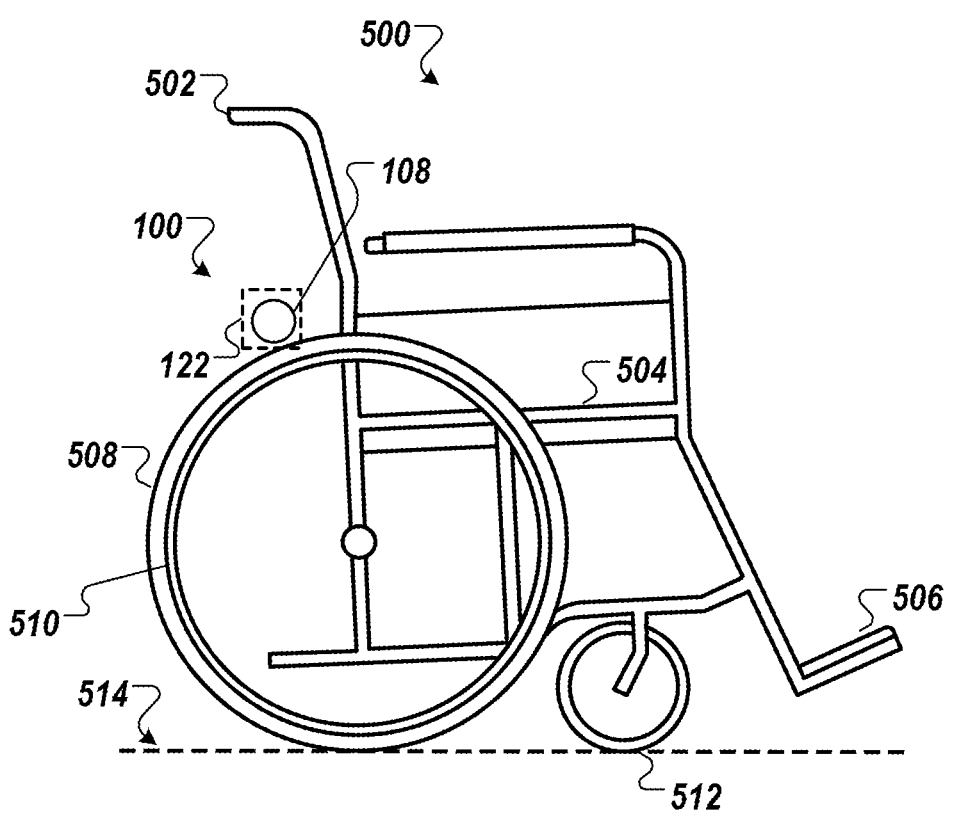
FIGS. 5A-5B show a side and rear view of the attachable power assisting device attached to a wheelchair.

FIG. 5A shows a side view of the attachable power assisting device 100 attached to one example of a wheelchair 500 in contact with a surface 514. The wheelchair 500 includes a handgrip 502, a seat 504, foot plate 506, a rear wheel 508, a pushrim 510, and a stability wheel 512, such as a stability wheel 512. The attachable power assisting device 100 is in contact with the rear wheel(s) 508, and the rear wheel(s) 508 are in contact with the ground 414.

FIG. 5B illustrates a rear view of the attachable power assisting device 100 attached to the wheelchair 500. The attachable power assisting device 100 is attached to a rear of the wheelchair in-between the rear wheels 508. The attachable power assisting device 100 is mounted longitudinally in-between the rear wheels 508. As such, one or more longitudinal surfaces of the housing 122 are positioned substantially perpendicular to a radius of the rear wheel 508. Accordingly, the first rotatable end 106 is in contact with a second one of the rear wheels 508. In addition, the second rotatable end 108 is in contact with a first one of the rear wheels 508. The power source 312 is detachably mounted to the housing 122 of the attachable power assisting device 100.

The two rear wheels 508 on the wheelchair 500 rotate independently. As such, the first motor 102 is coupled to the first driver 114 (shown in FIG. 3) and the second motor 104 is coupled to the second driver 116, so that the first and second motors 102, 104 can rotate independently. As explained above, positional signals, x(t), y(t), z(t) are input by the controller 302 and are output to the first and second motors 102, 104 as first and second rotational vector $V_1$, $V_2$, respectively. The wheelchair 500 shown in FIGS. 5A-5B is one example of a wheelchair. However, the 100 is adaptable to other manual wheelchairs including but not limited to wheelchairs that are self-propelled, foot-propelled, high back, reclining, tilting, bariatric, lightweight, and similar wheelchairs.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. In some implementations, the controller 302 includes instructions from one or more computer programs, e.g., one or more modules of computer program instructions, encoded on a computer program carrier, for execution by, or to control the operation of, data processing apparatus. The computer program carrier may be a tangible non-transitory computer storage medium. Alternatively or in addition, the computer program carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry controller. The processes and logic flows can also be performed by special-purpose logic circuitry, e.g., an FPGA, an ASIC, or a GPU, or by a combination of special-purpose logic circuitry and one or more programmed computers.

The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

While this specification contains many specific implementation details, these should not be construed as limitations on the scope of what is being claimed, which is defined by the claims themselves, but rather as descriptions of features that may be specific to particular implementations of particular aspects of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What we claim is:

1. An attachable power assisting device configured to provide electrical power for moving a wheelchair, the attachable power assisting device comprising:
   a first motor mechanically coupled to a first rotatable end via a first shaft;
   a first driver electrically coupled to the first motor, the first driver configured to control a velocity of the first motor;
   a first ring disposed between the first rotatable end and the first shaft;
   a second motor mechanically coupled to a second rotatable end via a second shaft;
   a second driver electrically coupled to the second motor, the second driver configured to control a velocity of the second motor;
   a second ring disposed between the second rotatable end and the second shaft; and
   a controller for sending control signals to the first driver and the second driver, wherein the control signals include information representing a first torque, a second torque, and rotational velocities for the first rotatable end and the second rotatable end, wherein the device is mountable behind and above a seat of the wheelchair.

2. The attachable power assisting device of claim 1, further comprising:
   a housing, at least, partially enclosing the first motor, the first driver, the second motor, and the second driver.

3. The attachable power assisting device of claim 2, wherein the housing includes a first hole and a second hole, and the first shaft and second shaft are disposed, respectively, through the first and second holes, and the first and second rotatable ends are disposed external to the housing.

4. The attachable power assisting device of claim 1, wherein the first and second rotatable ends are configured to rotate in opposite directions.

5. The attachable power assisting device of claim 4, wherein the first and second rotatable ends are configured to rotate in a same direction.

6. The attachable power assisting device of claim 1, wherein the controller is a joystick having a handle and a shaft, the shaft having up to 360 degree directionality.

7. The attachable power assisting device of claim 6, wherein the handle is configured to rotate up to 360 degrees about a center of the shaft.

8. The attachable power assisting device of claim 1, wherein the controller is configured to attach and detach to an interface that is electrically coupled to a processor.

9. The attachable power assisting device of claim 1, further comprising:
   a microcontroller configured to process control signals from the controller, the microcontroller electrically coupled to the first driver and the second driver.

10. An attachable power assisting device configured to provide electrical power for moving a wheelchair, the attachable power assisting device comprising:
   a first motor mechanically coupled to a first rotatable end via a first shaft;
   a first driver electrically coupled to the first motor, the first driver configured to control a velocity of the first motor;
   a first flexible ring disposed between the first rotatable end and the first shaft;
   a first filler disposed between the first rotatable end and the first flexible ring, the first filler being more rigid than the first flexible ring;

a second motor mechanically coupled to a second rotatable end via a second shaft;

a second driver electrically coupled to the second motor, the second driver configured to control a velocity of the second motor;

a second flexible ring disposed between the second rotatable end and the second shaft;

a second filler disposed between the second rotatable end and the second flexible ring, the second filler being more rigid than the second flexible ring; and a controller for sending control signals to the first driver and the second driver, wherein the control signals include information representing a first torque, a second torque, and rotational velocities for the first rotatable end and the second rotatable end, wherein the first and second flexible rings are made of a polymer, and the first and second fillers are made from a polylactic acid.

11. An attachable power assisting device configured to provide electrical power for moving a wheelchair, the attachable power assisting device comprising:

a first motor mechanically coupled to a first rotatable end via a first shaft;

a first driver electrically coupled to the first motor, the first driver configured to control a velocity of the first motor;

a first flexible ring disposed between the first rotatable end and the first shaft;

a first filler disposed between the first rotatable end and the first flexible ring, the first filler being more rigid than the first flexible ring;

a second motor mechanically coupled to a second rotatable end via a second shaft;

a second driver electrically coupled to the second motor, the second driver configured to control a velocity of the second motor;

a second flexible ring disposed between the second rotatable end and the second shaft;

a second filler disposed between the second rotatable end and the second flexible ring, the second filler being more rigid than the second flexible ring; and a controller for sending control signals to the first driver and the second driver, wherein the control signals include information representing a first torque, a second torque, and rotational velocities for the first rotatable end and the second rotatable end, the first rotatable end has a first cylindrical body having a first radial center extending through the first cylindrical body, the first shaft extends through the first radial center of the first cylindrical body, the second rotatable end has a second cylindrical body and a second radial center extending through the second cylindrical body, and the second shaft extends through the second radial center of the second cylindrical body.

12. A wheelchair power assisting system, comprising:

a first motor mechanically coupled to a first rotatable end via a first shaft;

a first driver electrically coupled to the first motor, configured to control a velocity of the first motor;

a first ring disposed between the first rotatable end and the first shaft;

a second motor mechanically coupled to a second rotatable end via a second shaft;

a second driver electrically coupled to the second motor, configured to control a velocity of the first motor;

a second ring disposed between the second rotatable end and the second shaft; and a non-transitory computer readable medium storing instructions, the instructions when executed by a processor configured to cause the first driver and the second driver to transmit control signals to the first motor and second motor, respectively, each of the control signals being a pulse-modulating width signal, wherein the system is mountable behind and above a seat of the wheelchair.

13. The wheelchair power assisting system of claim 12, wherein the processor transmits control signals to the first driver and the second driver, wherein the control signals include a first torque, a second torque, and rotational velocities for the first rotatable end and the second rotatable end.

14. The wheelchair power assisting system of claim 12, wherein the first motor and the second motor are configured to apply a torque to the first shaft and second shaft, respectively, the torque being between about 1 Newton meter (NM) and about 50 NM.

15. The wheelchair power assisting system of claim 12, wherein the processor is configured to send control signals to the first and second motors enabling the first rotatable end and the second rotatable end to rotate at a velocity between about 1 rotation per minute (RPM) and about 2000 RPM.

16. A wheelchair power assisting system, comprising:

a first motor mechanically coupled to a first rotatable end via a first shaft;

a first driver electrically coupled to the first motor, configured to control a velocity of the first motor;

a first flexible ring disposed between the first rotatable end and the first shaft;

a first filler disposed between the first rotatable end and the first flexible ring, the first filler being more rigid than the first flexible ring;

a second motor mechanically coupled to a second rotatable end via a second shaft;

a second driver electrically coupled to the second motor, configured to control a velocity of the first motor;

a second flexible ring disposed between the second rotatable end and the second shaft;

a second filler disposed between the second rotatable end and the second flexible ring, the second filler being more rigid than the second flexible ring;

a non-transitory computer readable medium storing instructions, the instructions when executed by a processor configured to cause the first driver and the second driver to transmit control signals to the first motor and second motor, respectively, each of the control signals being a pulse-modulating width signal; and a controller for transmitting control signals to the processor, wherein the processor is mounted within a housing, wherein the housing, at least, partially enclosing the first motor, the first driver, the second motor, and the second driver.

17. An attachable torque-supplying device comprising:

a first motor mechanically coupled to a first rotatable end via a first shaft;

a first driver electrically coupled to the first motor, configured to control a velocity of the first motor;

a first ring disposed between the first rotatable end and the first shaft;

a second motor mechanically coupled to a second rotatable end via a second shaft;

a second driver electrically coupled to the second motor, configured to control a velocity of the first motor;

a second ring disposed between the second rotatable end and the second shaft;

a non-transitory computer readable medium storing instructions, the instructions when executed by a processor configured to cause the first driver and the second driver to transmit control signals to the first motor and second motor, respectively;

a controller for transmitting control signals to the processor, wherein the control signals include a first torque, a second torque, and rotational velocities for the first rotatable end and the second rotatable end; and a housing, at least, partially enclosing the first motor, the first driver, the second motor, and the second driver, wherein the device is mountable behind and above a seat of a wheelchair.

18. The attachable torque-supplying device of claim 17, further comprising:

at least one first opening disposed in the first rotatable end; and at least one second opening disposed in the second rotatable end, wherein a first filler is disposed in the first opening and a second filler is disposed in the second opening, the first and second filler have a different density than a material of a first ring and a second ring.

19. The attachable torque-supplying device of claim 18, further comprising:

a microcontroller configured to process control signals from the controller, the microcontroller electrically coupled to the first driver and the second driver.

\* \* \* \* \*